United States Patent [19]

Pelt et al.

[11] 4,404,434

[45] Sep. 13, 1983

[54] COLLAPSIBLE STEREOPHONE

[75] Inventors: Thomas E. Pelt, Greenfield; Joseph C. Besasie, Milwaukee, both of Wis.

[73] Assignee: Koss Corporation, Milwaukee, Wis.

[21] Appl. No.: 291,248

[22] Filed: Aug. 10, 1981

[51] Int. Cl.³ .......... H04M 1/05
[52] U.S. Cl. .......... 179/156 R; 2/209
[58] Field of Search .......... 179/156 R; 2/209

[56] References Cited

U.S. PATENT DOCUMENTS

| | | | |
|---|---|---|---|
| 479,185 | 7/1892 | Hadden | 2/209 |
| 1,398,958 | 12/1921 | Basch | 2/209 |
| 1,571,471 | 2/1926 | Galayda | 179/156 R |
| 3,172,076 | 3/1965 | Alinari | 179/156 R |

FOREIGN PATENT DOCUMENTS

| | | | |
|---|---|---|---|
| 741692 | 9/1943 | Fed. Rep. of Germany | 179/156 R |
| 1218086 | 11/1969 | United Kingdom | 179/156 R |

OTHER PUBLICATIONS

Copy of Advertisement by Koss Corporation copyrighted 1981.

*Primary Examiner*—G. Z. Rubinson
*Assistant Examiner*—L. C. Schroeder
*Attorney, Agent, or Firm*—Quarles & Brady

[57] ABSTRACT

A stereophone includes a headband which supports cup assemblies at each of its ends. The cup assemblies can be pivoted to a transport position in which they are enclosed within the headband. The ends of the headband may be fastened together to retain the cup assemblies in this position.

2 Claims, 5 Drawing Figures

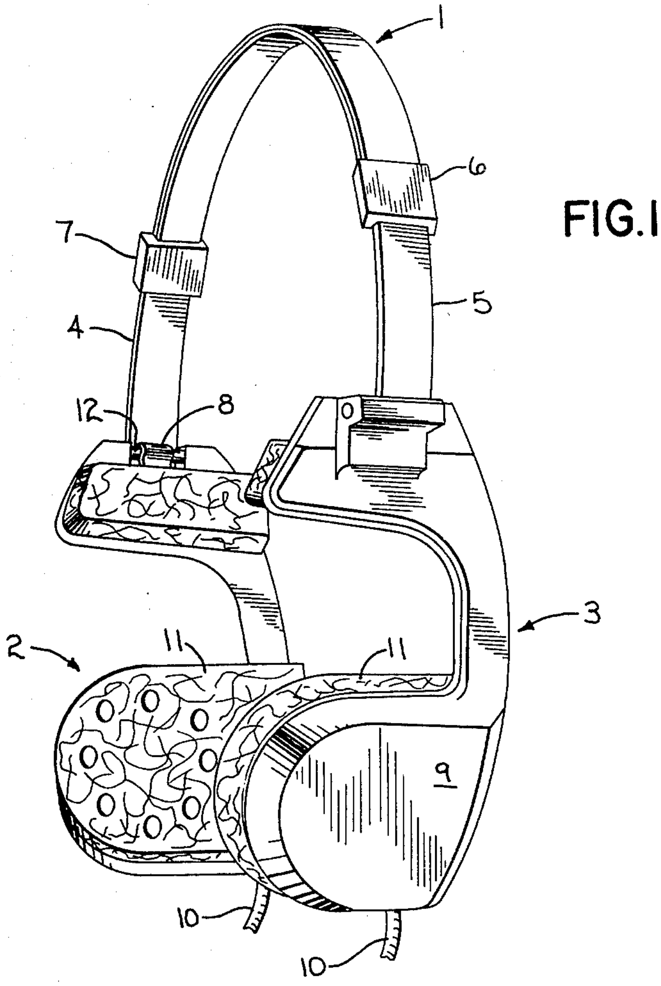
FIG. 1
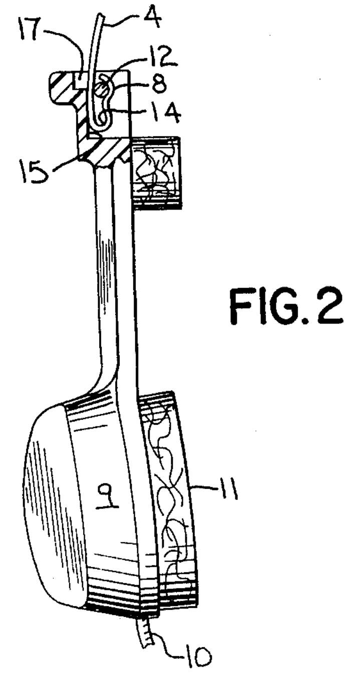
FIG. 2
FIG. 3
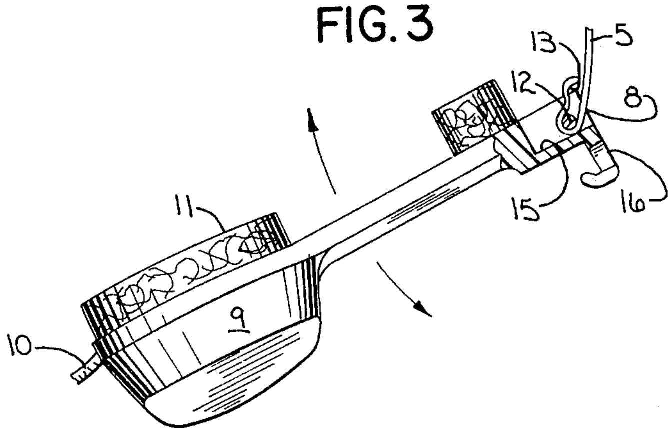

COLLAPSIBLE STEREOPHONE

BACKGROUND OF THE INVENTION

The field of the invention is stereophones used for the reproduction of high fidelity program material.

High quality stereophones are manufactured in many shapes and sizes. Most of them, however, include a pair of acoustic transducers which are held over the user's ears by a supporting structure which also encloses the acoustic transducer and provides an aesthetically pleasing appearance. In many stereophones this takes the form of a pair of ear cup assemblies which are held in place over the user's ears by a headband. Nearly all stereophones are intended for use in the home or business where the user is relatively inactive. More recently, however, high quality sound equipment has been miniaturized to the point where it can be carried by the user and operated while the user is actively engaged in sport or exercise. Stereophones for such equipment must be relatively small and compact.

SUMMARY OF THE INVENTION

The present invention relates to a stereophone which can be collapsed into a relatively small and compact package when not in use. More particularly, the present invention includes a flexible headband having cup assemblies attached to each of its ends by means which enable them to be pivoted from an operating position in which they extend downward from the ends of the headband to a transport position in which they are enclosed within the headband. Fastening means are formed adjacent each end of the headband, and when engaged, it retains the cup assemblies in their transport position.

A general object of the invention is to provide a stereophone which can be collapsed into a compact integral unit. The cup assemblies are nearly encircled by the flexible headband and held securely in this compact configuration when the fastening means at each end of the headband is engaged.

Another object of the invention is to provide a collapsible stereophone which can be easily changed from a transport configuration to an operating configuration. The fastening means are disengaged and the cup assemblies are pivoted into their operating position. Lock means are provided on each cup assembly to retain them securely in their operating position.

The foregoing and other objects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims herein for interpreting the scope of the invention.

BRIEF DESCRIPTION OF THE DRAWINGS

FIG. 1 is a perspective view of a stereophone which incorporates the present invention;

FIG. 2 is a partial elevation view of the stereophone of FIG. 1 with parts cut away to show a cup assembly locked in an operating position;

FIG. 3 is a partial elevation view of the stereophone of FIG. 1 with parts cut away to show a cup assembly unlocked to allow pivotal motion between its operating position and a transport position;

DESCRIPTION OF THE PREFERRED EMBODIMENT

Figure 4:
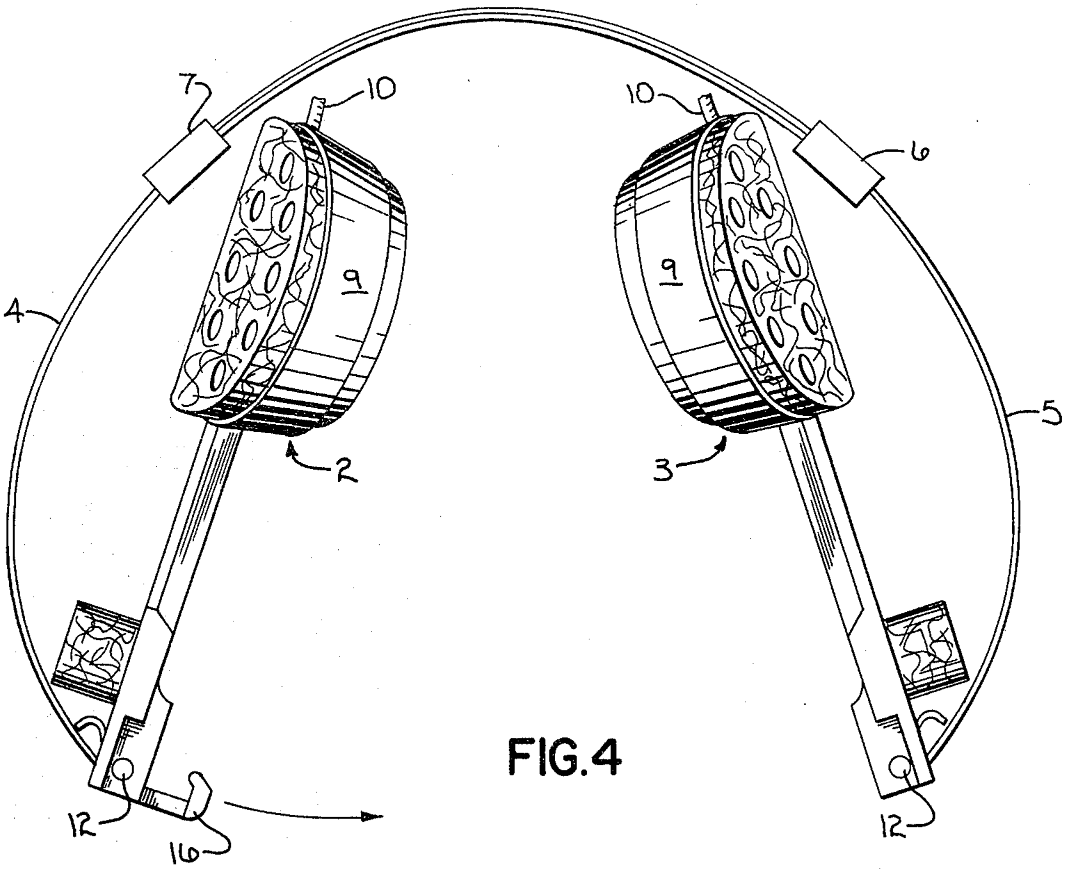
FIG. 4 is an elevation view of the stereophone of FIG. 1 showing the cup assemblies folded into their transport position.

Referring particularly to FIGS. 1 and 4, the stereophone includes a headband 1 which is formed in an arc and which has a pair of cup assemblies 2 and 3 attached to each of its ends. The headband 1 includes two flexible metal bands 4 and 5 which have molded plastic sleeves 6 and 7 attached to their respective ends. The other end of the metal bands 4 and 5 are formed into loops 8 which are employed to fasten the headband 1 to the cup assemblies 2 and 3. The length of the headband 1 can be adjusted by sliding the metal bands 4 and 5 through the sleeves 6 and 7.

The cup assemblies 2 and 3 each include a molded plastic case 9 which encloses an acoustic transducer (not shown in the drawings). The acoustic transducers receive an electrical signal through wires 10 that enter through the bottom of each case 9 and they emit sound through openings formed in a plastic foam cushion 11. These sound openings are directed inward toward the user's ears when the stereophone is in operation. Metal pins 12 are pressed into each case 9 and the loops 8 on the headband 1 wrap around these pins 12 to form a pivotal connection.

Referring particularly to FIGS. 1, 2 and 3, the loops 8 cooperate with the pins and the case 9 to form a locking mechanism which releasably retains each cup assembly in its operating position. The loops 8 are contoured to form two detents 13 and 14. When the pin 12 is positioned in the upper detent 13 the metal band 4 or 5 is locked in position against a retainer wall 15 which is molded as part of the case 9. In this locked position, the cup assemblies 2 and 3 are retained in their operating positions as shown in FIGS. 1 and 2. By pushing upward on the cup assembly 2 or 3, however, the pin 12 snaps into the lower loop detent 14 as shown in FIG. 3. In this unlocked position, the cup assembly 2 or 3 can be pivoted upward and inward into a transport position.

Figure 5:
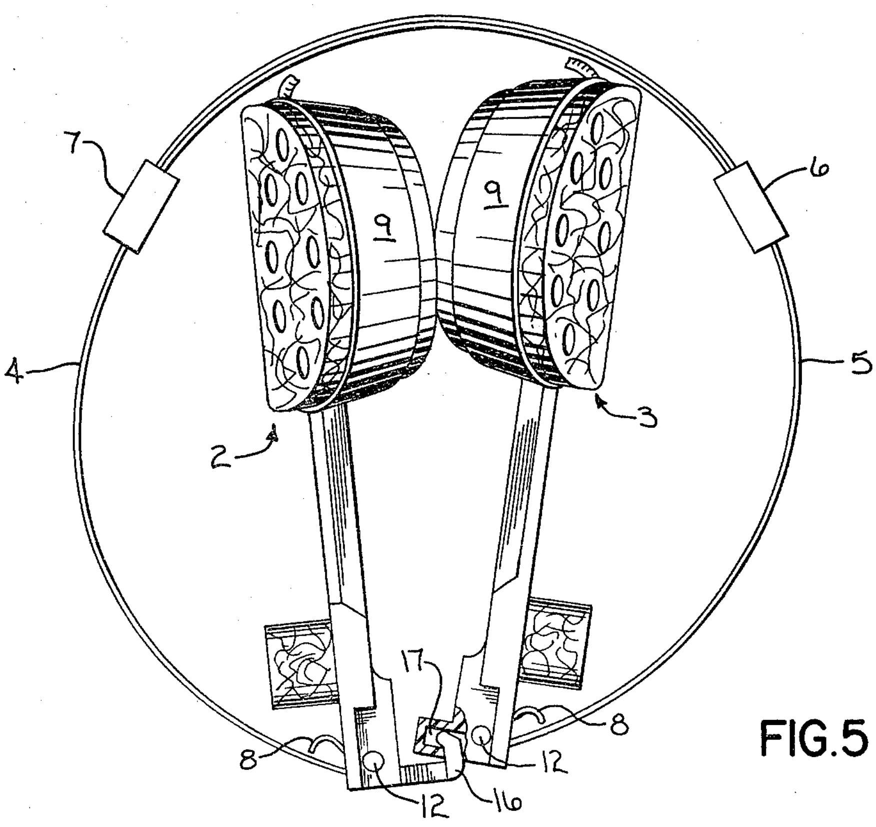
FIG. 5 is an elevation view of the stereophone of FIG. 4 with the fastening means engaged to retain the cup assemblies in their transport position.

Referring particularly to FIGS. 4 and 5, when both cup assemblies are pivoted to their transport position, they are substantially enclosed within the arc shaped headband 1. To retain them in this position, means are formed near each end of the headband 1 which enable the ends to be fastened together. More specifically, the fastening means is formed on the cup assemblies 2 and 3 adjacent the pivot rods 12, and it includes a hook 16 which is molded on the cup assembly 3 and a slot 17 which is molded into the cup assembly 2. When the cup assemblies are folded into their transport position, these fastening elements are positioned adjacent to one another. The headband 1 is flexible and the user may easily close it around the cup assemblies 2 and 3 and engage the hook 16 with the slot 17 to fasten the ends of the headband 1 together. The resulting structure is compact and the stereophone elements are tightly retained in place.

The stereophone of the present invention is particularly useful with portable equipment. When collapsed as shown in FIG. 5 it can be placed in a small container which is suitable for carrying or storing in compact spaces. When in use, however, the stereophone is unfolded and locked into a unitary structure which is comfortable to use and which provides outstanding acoustic performance.

We claim:

1. A stereophone, the combination comprising:

a flexible headband formed in an arc to fit over the head of a user and having a pair of ends;

a first cup assembly pivotally attached to one end of said headband for pivoted motion between an operating position in which it extends downward from the headband over the ear of a user and a transport position in which it is folded upward and within the arc formed by the headband;

a second cup assembly pivotally attached to the other end of said headband for pivotal motion between an operating position in which it extends downward from the headband over the other ear of a user and a transport position in which it is folded upward and within the arc formed by the headband; and fastening means for holding the ends of the headband together when both cup assemblies are pivoted to their transport positions to thereby substantially enclose them within the headband, said fastening means including a hook formed adjacent one end of the headband and an eye formed near the other end of the headband.

2. A stereophone, the combination comprising:

a flexible headband formed in an arc to fit over the head of a user and having a pair of ends;

a first cup assembly pivotally attached to one end of said headband for pivoted motion between an operating position in which it extends downward from the headband over the ear of a user and a transport position in which it is folded upward and within the arc formed by the headband;

a second cup assembly pivotally attached to the other end of said headband for pivotal motion between an operating position in which it extends downward from the headband over the other ear of a user and a transport position in which it is folded upward and within the arc formed by the headband;

fastening means for holding the ends of the headband together when both cup assemblies are pivoted to their transport positions to thereby substantially enclose them within the headband; and locking means are formed on each end of the headband to releasably retain each headphone cup in its operating position, and in which each locking means includes a contoured loop formed on the end of the headband and a pin mounted on the cup assembly, and the cup assembly is free to pivot about the end of the headband when the pin is positioned within a lower detent portion of the loop and the cup assembly is locked in its operating position when the pin is snapped into an upper detent portion of the loop.

* * * * *